3,020,253
PROCESS OF PLASTICIZING A VINYL CHLORIDE RESIN WITH DITETRAHYDROFURFURYL TEREPHTHALATE AND PRODUCT OBTAINED THEREBY
Robert M. Lukes, Lawrence Park, Pa., assignor to General Electric Company, a corporation of New York
No Drawing. Filed June 26, 1958, Ser. No. 744,649
6 Claims. (Cl. 260—30.4)

This invention relates to plasticized vinyl resins. More particularly, the invention is concerned with vinyl halide resins plasticized with a composition comprising ditetrahydrofurfuryl terephthalate having the formula

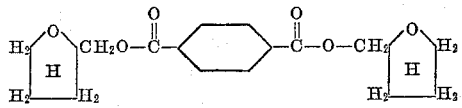

One of the difficulties in finding a suitable plasticizer for vinyl halide resins is to find one which gives, in part, sufficient flexibility to the vinyl halide resin as evidenced in some respects by elongation without adversely affecting the tensile strength of the plasticized composition. Unexpectedly, I have discovered that a specific plasticizer, namely, ditetrahydrofurfuryl terephthalate (hereinafter referred to as "difurfuryl ester") is able to plasticize a vinyl halide resin to give a product which has good tensile strength and yet has outstanding percent elongation and flexibility. The discovery that the ditetrahydrofurfuryl terephthalate was able to impart these outstanding properties simultaneously to the vinyl halide resin when employed as a plasticizer was entirely unexpected and in no way could have been predicted since when one employed, for instance, a very similar compound, namely, ditetrahydrofurfuryl o-phthalate, it was found that both the tensile strength and the percentage elongation were substantially lower than was obtained by using my above-described difurfuryl ester.

The vinyl halide resins capable of being plasticized by the difurfuryl ester may be such compositions as, for example, (1) the polyvinyl halides, such as, for instance, polyvinyl chloride (including the different molecular weight forms, e.g., gamma polyvinyl chloride, etc.), polyvinyl bromide, etc.; (2) vinyl resins produced by the conjoint polymerization of a vinyl halide, for example, vinyl chloride and a vinyl ester of a lower saturated aliphatic monocarboxylic acid, for instance, vinyl acetate (such vinyl chloride-vinyl acetate copolymers being available under the trade name of "Vinylite" resin wherein the vinyl chloride component is present in a preponderant amount), vinyl propionate, vinyl butyrate, vinyl hexoate, vinyl acetobutyrate, vinyl chloroacetate, vinyl chloroprionate, etc., it being understood from the foregoing examples that the term "lower saturated aliphatic monocarboxylic acid" embraces ones containing at most six carbon atoms; (3) vinyl resins produced by the conjoint polymerization of a vinyl halide and an acrylic compound; (4) copolymers of vinyl halides, for example, vinyl chloride, and a vinylidene halide (e.g., vinylidene chloride), etc.; and (5) many other vinyl resin copolymers, such as the copolymers of three component systems, for instance, vinyl chloride, vinyl acetate, and ethyl methacrylate. As will be understood by those skilled in the art, other multi-component copolymers may be used, the only requirement being that at least one of the components is a vinyl halide. Further methods of preparation of vinyl halide resins employed herein and additional examples of vinyl copolymers which can be plasticized with the aforementioned ditetrahydrofurfuryl terephthalate may be found in D'Alelio Patents 2,378,753 and 2,299,740.

The proportions of the difurfuryl terephthalate employed in combination with the vinyl halide resin may be varied within wide limits. Generally, I prefer to employ from 10 to 70 percent of the plasticizer based on the total weight of the vinyl halide resin and the plasticizer, and preferably within the range of from 25 to 60 percent of the ditetrahydrofurfuryl terephthalate, based on the total weight of the latter and the vinyl halide resin.

In addition, heat stabilizers, such as lead oxide, lead silicate, tribasic lead sulfate, lead carbonate, etc., in amounts ranging from about 0.5 to 10 to 15 percent, by weight, based on the weight of the vinyl halide resin may be incorporated. In addition, various fillers, such as lithopone, titanium dioxide, etc., as well as other common plasticizers, for instance, dioctyl phthalate, tricresyl phosphate, etc., pigments and other modifying materials may be incorporated without detrimental effects on the heat, light, and electrical stability of the plasticized materials.

In order that those skilled in the art may better understand how the present invention may be practiced, the following examples are given by way of illustration and not by way of limitation. All parts are by weight.

*Example 1*

A mixture of 300 grams of tetrahydrofurfuryl alcohol, 166 grams terephthalic acid, and 10 grams of p-toluenesulfonic acid (33% aqueous solution) was heated until 50 ml. water had distilled. The final temperature of the mixture was 230° C. The mixture was cooled and dissolved in 600 ml. chloroform and this solution was washed with 500 ml. water and then with 1000 ml. of 2 M aqueous potassium bicarbonate solution. The chloroform solution was dried over anhydrous sodium sulfate, filtered and evaporated on a steam bath. The residue was distilled under vacuum and 400 grams of ditetrahydrofurfuryl terephthalate boiling at 200–203° C. (0.3 mm.) and having a melting point of 55–56° C. was obtained. Analysis of this compound showed it to be the desired terephthalate as evidenced by the fact that it contained 64.19% carbon and 7.0% hydrogen as contrasted to theoretical amounts of 64.65% carbon and 6.63% hydrogen.

*Example 2*

In order to compare the advantages of this terephthalate ester with another similar ester, particularly ditetrahydrofurfuryl o-phthalate, the latter ortho phthalate was prepared in accordance with the directions described in Japanese Patent 3,686 (1951).

*Example 3*

Each of the plasticizers described in Examples 1 and 2 was mixed with gamma polyvinyl chloride in an amount equal to 60 parts of the polyvinyl chloride and 40 parts of the terephthalate or ortho-phthalate ester as the case may be. The two mixtures were molded into the form of flat sheets suitable for testing. The sheets were tested for tensile strength and percent elongation with the following results. The polyvinyl chloride plasticized with the ditetrahydrofurfuryl ortho-phthalate had a tensile of about 2923 p.s.i. and a percent elongation of about 234%. In contrast to this, the polyvinyl chloride plasticized with the ditetrahydrofurfuryl terephthalate had a tensile strength of 3260 p.s.i. and a percent elongation of 400%.

It will, of course, by apparent to those skilled in the art that other vinyl halide resins and other proportions of ingredients may be employed without departing from the scope of the invention. The claimed plasticized compositions can be used for making shower curtains, table cloths, rain coats, etc. They are eminently suitable for insulating electrical conductors, particularly copper conductors.

What I claim as new and desire to secure by Letters Patent of the United States is:

1. A composition of matter composed of a vinyl chloride resin and a plasticizer therefor comprising ditetrahydrofurfuryl terephthalate.
2. A composition of matter comprising polyvinyl chloride plasticized with ditetrahydrofurfuryl terephthalate.
3. A composition of matter comprising (1) a vinyl chloride resin composed of a copolymer of vinyl chloride and vinyl acetate, and (2) a plasticizer therefor comprising ditetrahydrofurfuryl terephthalate.
4. The process for plasticizing a vinyl chloride resin which comprises incorporating therein ditetrahydrofurfuryl terephthalate in an amount wherein the terephthalate ester comprises, by weight, from 10 to 70% of the total weight of the latter and the vinyl chloride resin.
5. The process for plasticizing a polyvinyl chloride resin which comprises incorporating therein ditetrahydrofurfuryl terephthalate in an amount wherein the terephthalate ester comprises, by weight, from 10 to 70% of the total weight of the latter and the polyvinyl chloride.
6. The process for plasticizing a vinyl chloride-vinyl acetate copolymer which comprises incorporating therein ditetrahydrofurfuryl terephthalate ester in an amount wherein the terephthalate comprises, by weight, from 10 to 70% of the total weight of the latter and the copolymer of vinyl chloride and vinyl acetate.

References Cited in the file of this patent

UNITED STATES PATENTS

| | | |
|---|---|---|
| 2,213,752 | Swan | Sept. 3, 1940 |
| 2,234,615 | Alexander | Mar. 11, 1941 |
| 2,259,141 | Russell | Oct. 14, 1941 |
| 2,757,180 | Dazzi | July 31, 1956 |